(12) United States Patent
Stocker

(10) Patent No.: US 6,739,954 B2
(45) Date of Patent: May 25, 2004

(54) GRINDING PIN FOR GRINDING MACHINES COMPRISING RESIN BONDED SELECTIONS OF ROUGH GRIT AND FINE GRIT

(75) Inventor: Mark Andrew Stocker, Horthampton (GB)

(73) Assignee: Unova U.K. Limited (GB)

( * ) Notice: Subject to any disclaimer, the term of this patent is extended or adjusted under 35 U.S.C. 154(b) by 0 days.

(21) Appl. No.: 10/182,865
(22) PCT Filed: Jan. 10, 2001
(86) PCT No.: PCT/GB01/00073
§ 371 (c)(1),
(2), (4) Date: Aug. 1, 2002
(87) PCT Pub. No.: WO01/56739
PCT Pub. Date: Aug. 9, 2001

(65) Prior Publication Data
US 2003/0003853 A1 Jan. 2, 2003

(30) Foreign Application Priority Data
Feb. 2, 2000 (GB) .............................................. 0002251

(51) Int. Cl.⁷ ................................................. B24B 1/00
(52) U.S. Cl. ............................. 451/57; 451/44; 451/27; 451/180; 451/66
(58) Field of Search ............................ 451/44, 27, 180, 451/541, 58, 66, 461, 462

(56) References Cited

U.S. PATENT DOCUMENTS

| | | | | |
|---|---|---|---|---|
| 3,183,632 A | * | 5/1965 | Ferchland | 451/541 |
| 4,286,415 A | * | 9/1981 | Loreto | 451/43 |
| 4,841,676 A | * | 6/1989 | Barwasser | 451/461 |
| 5,542,876 A | * | 8/1996 | Field, Jr. | 451/540 |
| 5,658,189 A | * | 8/1997 | Kagamida | 451/66 |
| 5,727,990 A | * | 3/1998 | Hasegawa et al. | 451/44 |
| 5,738,563 A | * | 4/1998 | Shibata | 451/5 |
| 6,280,294 B1 | * | 8/2001 | Miyamoto | 451/34 |
| 6,461,228 B2 | * | 10/2002 | Stocker et al. | 451/44 |

* cited by examiner

*Primary Examiner*—George Nguyen
(74) *Attorney, Agent, or Firm*—Reising, Ethington, Barnes, Kisselle, P.C.

(57) ABSTRACT

A grinding pin (53) for grinding notches in the edges of disc workpieces, such as semi-conductor wafers, comprises a metal spindle (132) for mounting in a grinding machine, and an adjoining cylindrical region having axially spaced sections of fine grit (160) and rough grit (162), the latter being axially nearer the spindle (132). In use on a grinding machine having a rotatable forming wheel, similar profiled notch-grinding grooves (140) and (142) are formed by the wheel in the grinding sections (162) and (160) respectively.

17 Claims, 5 Drawing Sheets

GRINDING PIN FOR GRINDING MACHINES COMPRISING RESIN BONDED SELECTIONS OF ROUGH GRIT AND FINE GRIT

This invention relates to grinding machines and to grinding wheels for use in such machines for grinding notches in the edges of discs such as wafers of silicon for use in the construction of semi-conductor devices, and to methods of grinding edge regions of such discs so as to form notches therein. Since the notches are of relatively small dimensions relative to the size of the wafers, grinding wheels used to form such notches are commonly referred to as grinding pins.

BACKGROUND TO THE INVENTION

A grinding machine for grinding discs is disclosed in WO97/48522 and incorporated herein by reference. WO97/48522 discloses use of a metal-bonded CBN or diamond wheel on a grinding machine to rough grind the edge of a disc, such as a semiconductor wafer, before use of a softer resin-bonded CBN wheel for finish grinding the disc edge and further describes an in situ technique for forming and re-forming a groove in the resin bonded CBN grinding wheel to grind the correct shape around the disc edge.

The machine also includes a small diameter grinding pin for grinding a notch of predetermined proportions around the edge of the ground disc.

British Patent Specification No. 2335620 discloses a grinding pin for notch grinding, for example for use in the machine described in WO 97/48522, the pin having a cylindrical region sufficiently long that a succession of profiled grooves for producing the notch can be formed, whereby as one such groove becomes too worn for further use one or more further grooves can be formed in the pin. One embodiment of pin described in the Specification is a pin having a metal bonded diamond section axially nearer the pin spindle and a resin bonded formable section axially more remote from the spindle. In use, a groove in the metal bonded section is used for rough grinding the notch and a groove formed in the resin bonded formable section is used for finish grinding the notch.

A problem with the aforesaid arrangement of the grinding pin is that of aligning the metal bonded and the resin bonded sections.

THE INVENTION

According to one aspect of the present invention, a grinding pin for notch grinding comprises a cylindrical region long enough for at least two profiled grooves to be formed thereon respectively in axially spaced sections of the cylindrical region, the section axially more remote from the pin spindle being a resin-bonded section of rough grit for rough grinding the notch and the section axially nearer the pin spindle being a resin-bonded section of fine grit for finish grinding the notch.

The invention overcomes the problem of aligning the respective sections to be used for rough and finish grinding the notch, because it is possible to use the same groove dressing or forming wheel, mounted on the same machine, to form both or all the grooves.

Preferably, the size of the grit for rough grinding the notch is between two and three times the size of the grit for finish grinding the notch.

Either or both of the rough grinding and finish grinding sections of the cylindrical pin, but especially the latter, may be long enough for one or more further grooves to be successively formed when the first groove becomes too worn for further use.

The invention also relates to a grinding machine, preferably a CNC grinding machine, having a work spindle, a grinding spindle able to carry a blank for the aforesaid grinding pin, the blank having a section of rough grit and a section of fine grit, and a forming wheel rotatable to form a notch-grinding groove in the rough grit section and a notch-finishing groove in the fine grit section.

The invention therefore also relates to a method of forming notches of rough grinding and notch-finishing grooves on the aforesaid grinding machine.

The forming wheel may be mounted on the same spindle as the workpiece.

The grinding material may be rough grit resin-bonded CBN or diamond in the case of the rough grinding section and fine grit resin-bonded diamond in the case of the finish grinding section.

The term "resin-bonded", as used herein, includes bonding with a vitreous material.

It is to be noted that, in contrast to the disclosure of FIG. 7 of British Patent Specification No. 2335620, wherein a resin-bonded section is used in place of a metal-bonded section, it is preferable for the section for finish grinding to be nearer the pin spindle, i.e. the stiffer section of the pin.

BRIEF DESCRIPTION OF THE DRAWINGS

The invention will now be described by way of example, with reference to the accompanying drawings, in which.

DESCRIPTION

Figure 1:
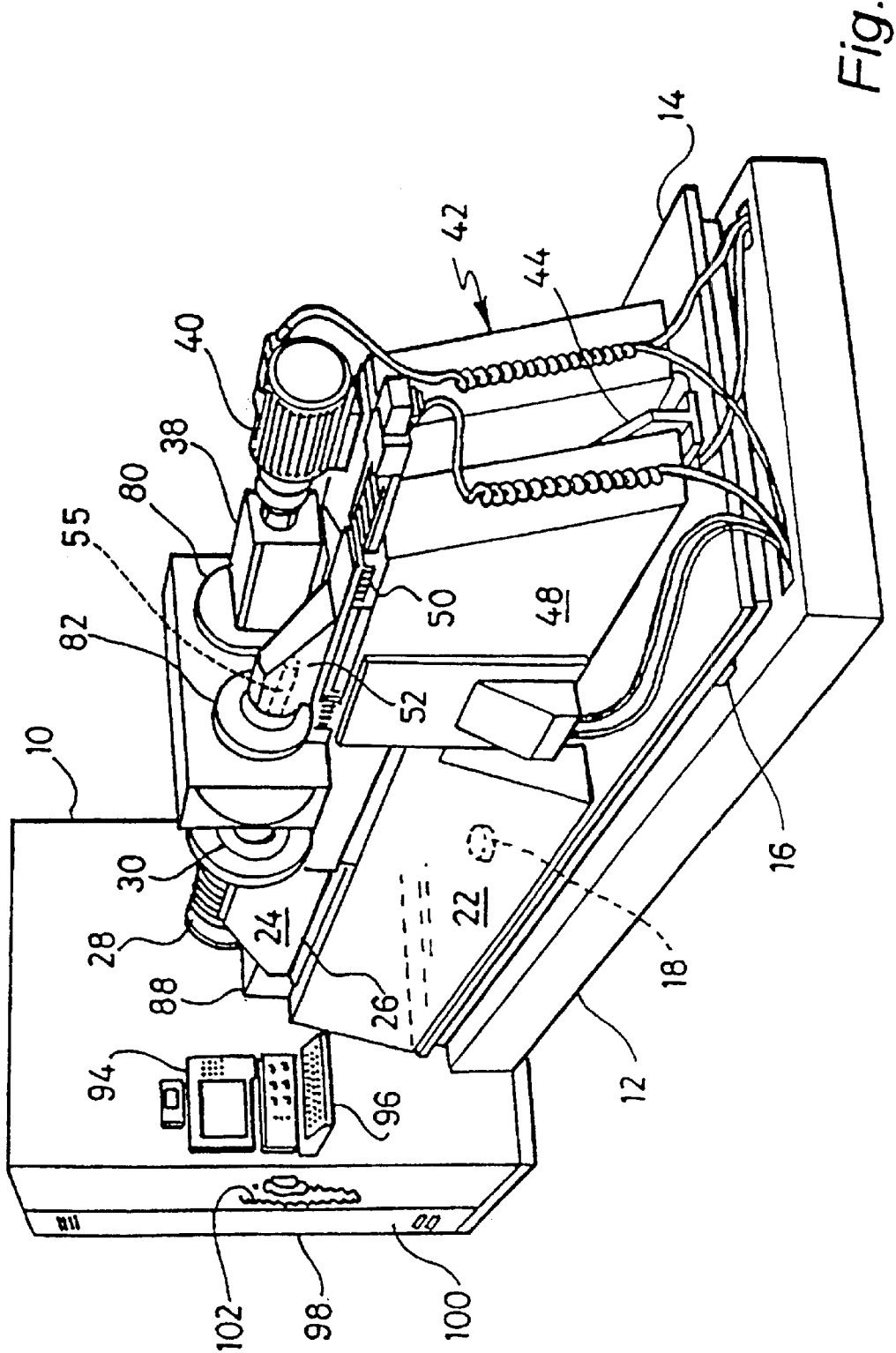
FIG. 1 is a perspective view, not to scale, from the side on which a user normally stands of a grinding machine incorporating a formable grinding pin carried on a spindle.
Figure 2:
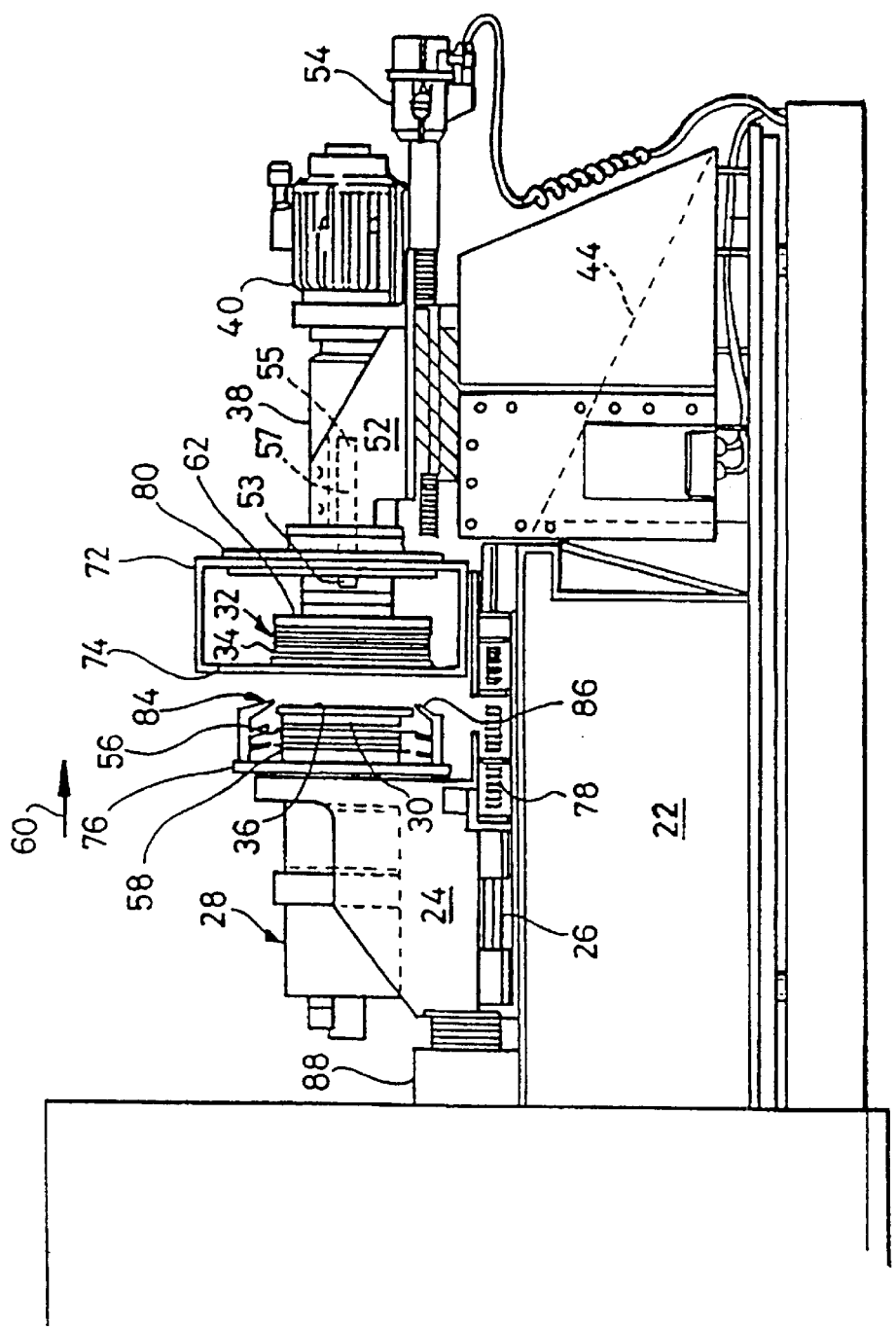
FIG. 2 is a side view, not to scale, from the side on which a user normally stands of the machine shown in FIG. 1, and illustrating a sub-assembly.
Figure 3:
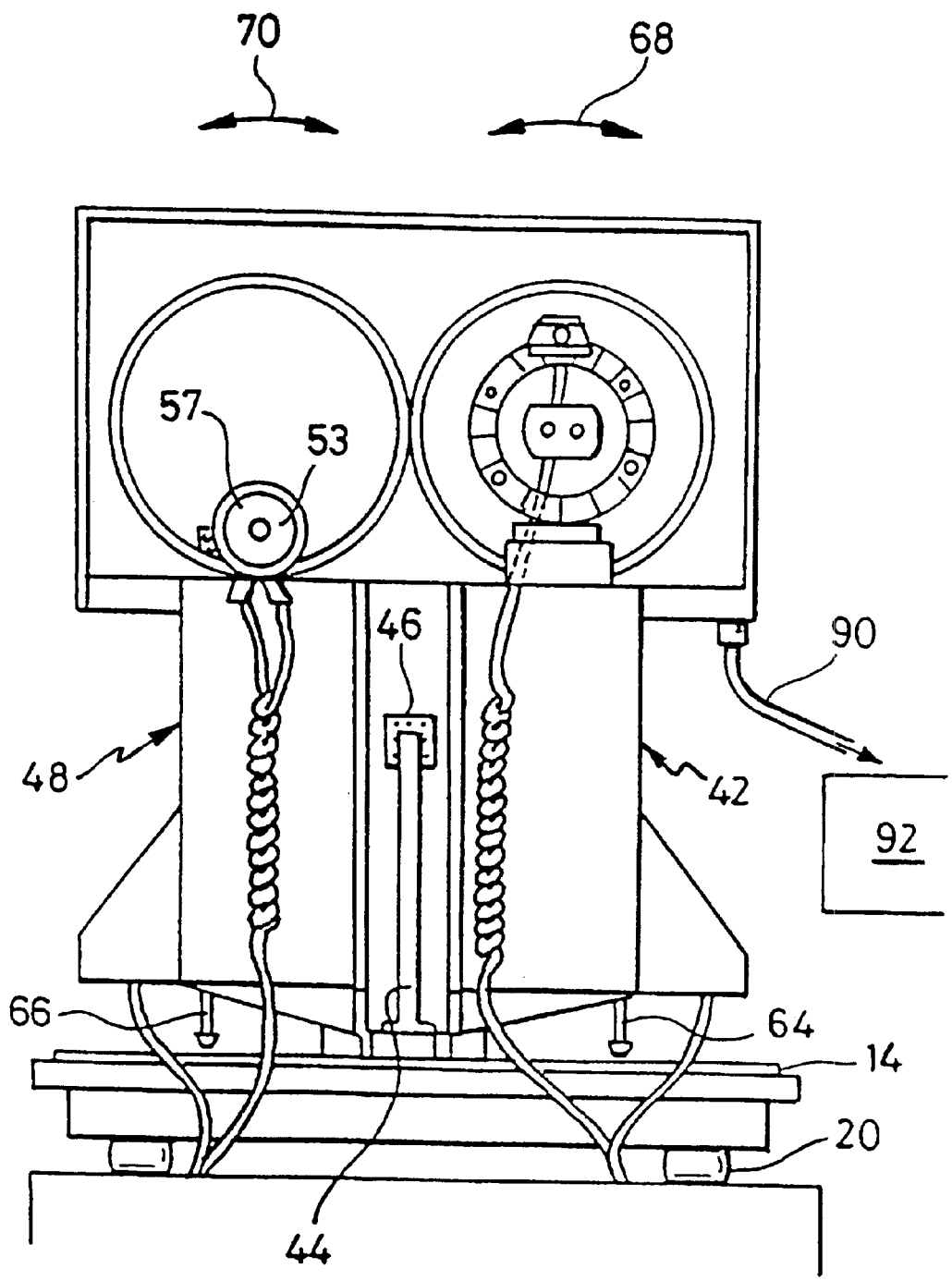
FIG. 3 is an end view of the machine shown in FIGS. 1 and 2.

FIGS. 1, 2 and 3 illustrate pictorially part of an overall machine station for notch grinding circular discs (wafers) of silicon or similar material.

The machine shown in FIGS. 1 to 3 comprises a control cabinet 10 from which extends a machine bed 12 which carries a floating platform 14 carried on three vibration absorbing feet, one of which can be seen in FIG. 1 at 16 and the second part 18 is mounted centrally before the base region 22 and is shown in dotted outline in FIG. 1, and the third can be seen at 20 in FIG. 3.

The platform 14 includes an integral support structure or base 22 which carries a workhead 24 which is slidable axially along a slideway 26 mounted on an upper surface of the base 22 and which includes a spindle drive motor 28 and vacuum chuck 30 for carrying wafers to be ground.

Edge grinding is achieved by means of a grinding wheel 32 containing a number of annular grooves such as 34 for engaging the edge of a wafer workpiece designated in FIG. 2 at 36.

The grinding wheel spindle (not shown) carried in bearing assembly 38 is rotated by an electric motor 40.

Items 38 and 40 are carried on a support generally designated 42 which is mounted close to the centre line of the platform 14 to one side of a rigid strengthening plate 44 which is bolted through flanges to the platform 14 along its base and is secured at its upper end by bolts through another flange 46 to the machine base 22. The function of the plate 44 is to increase the rigidity of the platform 14 relative to the base 22 and resist transverse vibrations which might otherwise be introduced.

Equidistant from and on the other side of the plate 44 is a second support 48 which carries a slideway 50 on which is mounted a second spindle drive 52 which carries a notch grinding spindle 57 having a notch grinding pin 53 at one end, and associated spindle motor 55.

Axial movement of the spindle drive 52 is provided by a drive unit 54 (see FIG. 2). The spindle drive 52 can also be used to grind the internal diameter of an annular disc.

The workhead edge grinding and notch grinding spindles are mounted in air bearings and the workhead spindle typically has a speed range of 2 to 1000 revs per minute, the edge grinding spindle typically has a speed range up to 6000 revolutions per minute and the speed of the notch grinding spindle 53 is typically up to 70,000 revolutions per minute.

On the workhead spindle to the rear of the chuck 30 are mounted forming wheels best seen in FIG. 2 at 56 and 58. Indexing the workhead 24 in the direction of the arrow 60 in FIG. 2 allows the workpiece disc 36 to be engaged by one of the slots such as 34 in the grinding wheel 32 and further movement in the direction of the arrow 60 allows the disc 36 to clear the end face 62 of the grinding wheel assembly and to allow the forming wheels 56 or 58 to engage in the appropriate grooves in the grinding wheel 32.

Lateral movement of the grinding wheel or notch grinder as required is achieved by tilting the support structures 42 and 48 as appropriate relative to the platform 14. To this end both of the structures 42 and 48 are pivotally attached to the platform 14 near the centre line thereof and two stops 64 and 66 respectively (see FIG. 3) prevent excessive outward movement.

The pivoting is provided by means of flexures (as will be described) which allow for pivoting movement about two parallel axes close to the centre line of the platform 14 so that structure 42 can describe a small arc such as denoted by arrow 68 and structure 48 can describe an arc as denoted by reference numeral 70.

Drive means for achieving the pivoting movement will be described with reference to later figures.

Attached to the base 22 is a clear polycarbonate rectilinear housing 72 through which the grinding wheel spindle protrudes. A large, generally oval opening 74 in the face of the housing 72 allows a similarly shaped closure 76 mounted on the workhead 24 to enter and seal off the opening 74 upon appropriate forward movement of the workhead 24 in the direction of the arrow 60 as aforesaid.

An inflatable ring seal 78 around the closure 76 (or alternatively around the internal lip of the opening 74) provides for a fluid tight seal between the closure 76 and the opening 74.

The housing 72 is slidable relative to the base 22 and bellows seals 80 and 82 are provided between the spindle drives 38 and 52 so that after the seal has been made between the closure 76 and the opening 74, the housing 72 will in fact move axially with the workhead assembly 24. Sufficient clearance is provided to the rear of the bellows to allow the housing 72 to move in a continuing sense in the direction of the arrow 60 to allow for the grooves in the grinding wheel to be formed. Movement in the opposite sense is also accommodated by the bellows 80 and 82 so that the closed housing 72 can also follow the workhead 24 as it moves in an opposite sense to that of arrow 60 to allow for the edge of the disc 36 to be engaged by one of the grinding grooves such as 34.

Coolant fluid is sprayed onto the workpiece through nozzles 84 and 86 and similar nozzles are provided for spraying similar fluid onto the forming wheels when required. An interlock is provided to prevent coolant fluid being jetted unless the housing 72 is closed and sealed by the closure 76.

After a grinding operation has been completed and after a final wash with fluid, the housing 72 can be opened by deflating the edge seal 78 and withdrawing the workhead 24 in a direction opposite to that of arrow 60 to the position shown in FIG. 2. The finished workpiece 36 can then be demounted and a fresh workpiece installed.

Wheel Forming/dressing

Wheel forming can be performed initially before any workpiece has been mounted, in which case the housing 72 is closed by appropriate movement of the workhead 24 and closure 76 without first mounting a workpiece such as 36 on the chuck 30. Wheel forming is performed by appropriate axial movement of the workhead 24 and lateral movement of support 42, so that each of the grooves, such as groove 34, is engaged by the appropriate forming wheel such as 56 or 58. Coolant fluid is provided during the wheel forming operation.

After initial wheel forming, the assembly may be separated by breaking the seal 78 as before mentioned. After mounting a workpiece 36, the assembly can be closed again and grinding undertaken as before described.

Typically re-forming of the groove is performed during machine downtime after one workpiece has been removed and before a subsequent workpiece has been installed, but in a development of the machine in which edge profile checking of the workpiece 36 is performed in situ on the workhead, it may be advantageous to allow for re-forming with the workpiece in place.

Notching

If a workpiece is to be notched, the support 42 is moved laterally to disengage the wheel from the workpiece and support 48 is moved laterally instead so as to engage the edge of the workpiece 36 by the notching pin 53. After notching, the support 48 is moved in an opposite sense so as to disengage the pin from the workpiece.

Polishing

In an alternative arrangement, a polishing wheel may be mounted on the wheel spindle as well as the grooved grinding wheel, and by axially shifting the workpiece spindle, so the polishing wheel can be brought into engagement with the edge of the workpiece 36.

A drive for shifting the workhead 24 along the slideway 26 is provided at 88.

As shown in FIG. 3, a drainpipe 90 conveys fluid from the housing 72 to a storage tank 92 and a pump (not shown) is provided to recirculate the fluid from the tank. A filter may be provided in the tank or in the line between the tank and the pump.

The control housing 10 includes a television display 94 and keyboard 96 and a hand-held control unit 98 is connected via a flying lead 100 to a connection plug 102. An operator can remove the unit 98 and walk to the machine with the unit 98 in his hand, and by pressing appropriate buttons instigate or arrest operation of the machine. The housing 10 houses a computer based control system for supplying control signals and power to the drives on the machine and for receiving signals from transducers, switching and other position/operation/touch etc signal generating sensors on the machine.

The slideway 26 on which the workhead slides, is preloaded, and the workhead is driven by server motors and fitted with a high resolution position coder to provide smooth motion during axis move interpolation.

Grinding infeed is achieved as previously described by tilting the structures 42 or 48 as required to bring the grinding element carried thereon into engagement with the edge of the workpiece 36. Although the movement is not truly linear, but arcuate, this can be accommodated in the control signals generated by the control system housed within the housing 10.

Whilst the jets such as 84 and 86 can be used to supply cutting fluid during grinding, they or other jets may be used to direct jets of cleaning fluid at the overhanging lip of the wafer whilst it is still being rotated but after grinding. This prevents grinding swarf from running down the back face of the wafer as it is removed from the chuck.

Grinding Process

Typically edges are ground in a two-stage process using a plunge grind roughing operation and a second plunge grind finish cycle which includes a rapid advance of the grinding wheel until a touch sensor detects contact with the workpiece wafer. The grinding wheel axis position at touchdown is used to monitor wheel wear and to ensure that the material removed per finish cut cycle is kept constant. Grinding wheelforms are maintained by using metal-bonded diamond forming wheels permanently mounted on the workhead chuck. The reforming process can be fully automatic and can be programmed to occur every nth wafer, or whenever the ground edge profile becomes unacceptable (as determined by optical inspection of the disc edge profile) or when the touchdown point indicates excessive wheel wear.

Damping

In order to reduce unwanted vibration and resulting grinding damage to the minimum, the structural components making up the grinding machine are filled at least partially with polymer concrete, particularly sections of the base 22 and the bed 12 and if desired also the platform 14.

Subassembly Flexure Mounting

Figure 4:
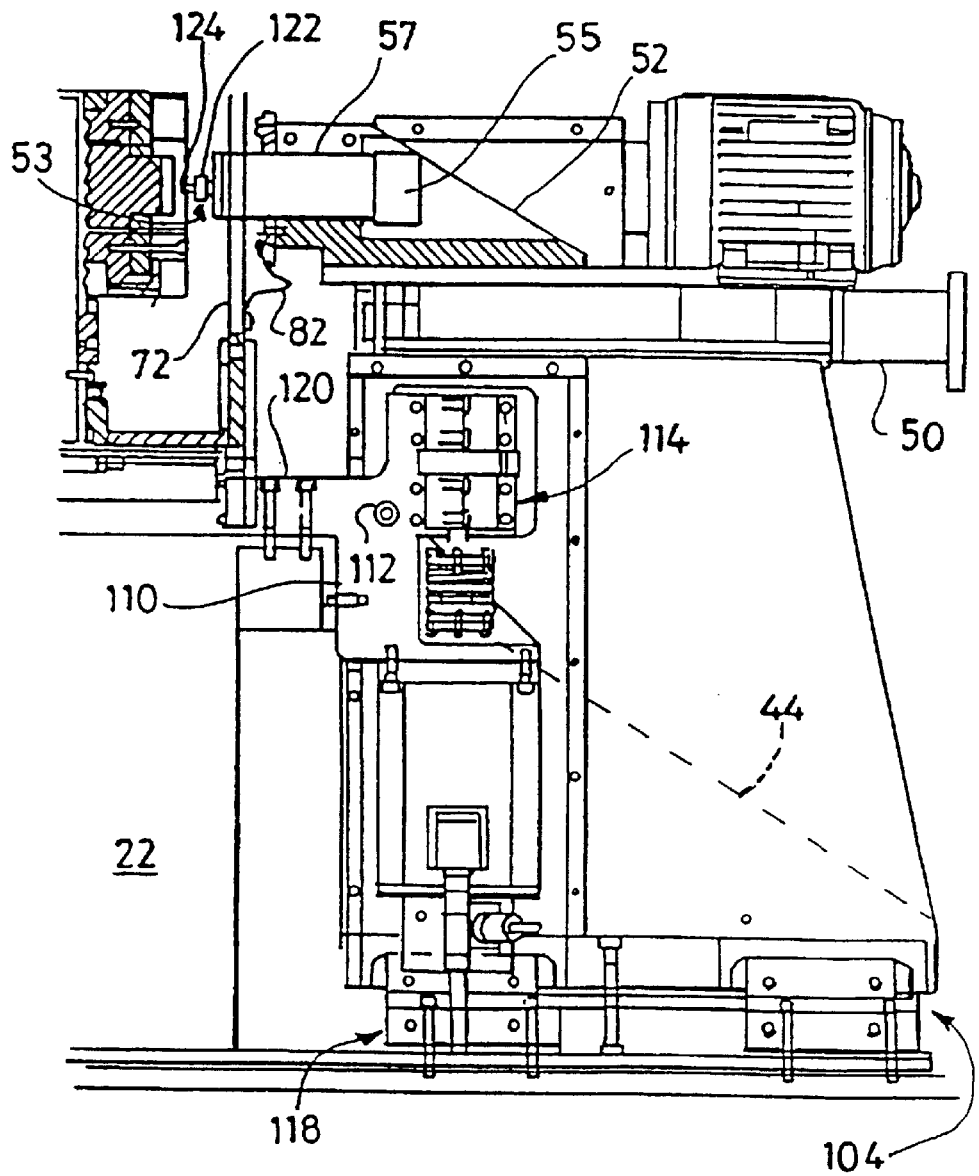
FIG. 4 is a side view of the sub-assembly end of the machine to an enlarged scale and partly in section.

FIG. 4 illustrates how the two structures 42 and 48 are mounted for hinging movement to permit wheel infeed. As shown in FIG. 4, the inboard edges of the two structures 42 and 48 are connected to the platform 14 by means of flexures (sometimes referred to as strip-hinges) one of which is shown at 104. A second pair of flexures are provided towards the other end of the structures 42 and 48 nearer to the machine base 22.

Whilst the flexures 102 and 104 permit tilting of the structures about one axis, they do not readily permit any other movement of the structures 42 and 48 relative to the platform 14 about any other axis. Consequently the coupling of the structures 42 and 48 to the platform 14 is very stiff in all directions except about the hinge axis of the flexures.

Cam Drive

FIG. 4 is a side view of the end of the machine, albeit to a slightly reduced scale. As with the other views, it is shown partly cut-away so as to reveal the cam drive mechanism generally designated 114 which acts on the structure 48. A captive washer 112 is shown at the side of the drive mechanism.

FIG. 4 also shows the two flexure mountings at the base of the unit 48, the outboard one being designated 104 and the inboard one being designated 118.

As previously mentioned each of the cam drive arrangements is carried within a rigid housing 110 and the latter is more clearly visible in FIG. 4 as is the horizontal leg 120 by which it is bolted to a protruding plate from the end of the base 22.

Also visible in FIG. 4 is the motor 55 for driving the chuck 122 from which the notch grinding spindle 124 protrudes. The motor 55 is carried within a housing 52 previously described in respect of FIG. 1, and the housing 52 slides along a slideway 50 as previously described.

FIG. 4 shows the bellows seal 82 attaching the housing 52 sealingly to the opening in the casing 72, through which the motor 55 and spindle 57 carrying pin 53 protrude.

Figure 5:
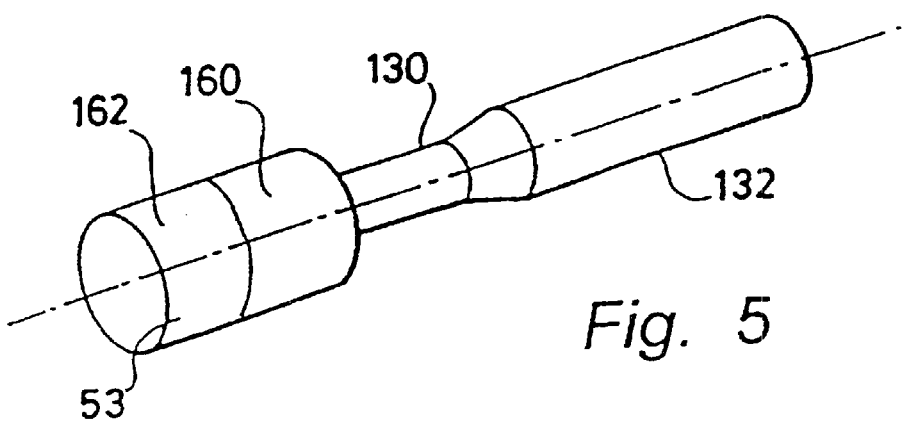
FIG. 5 is a perspective view of the formable pin.
Figure 6:
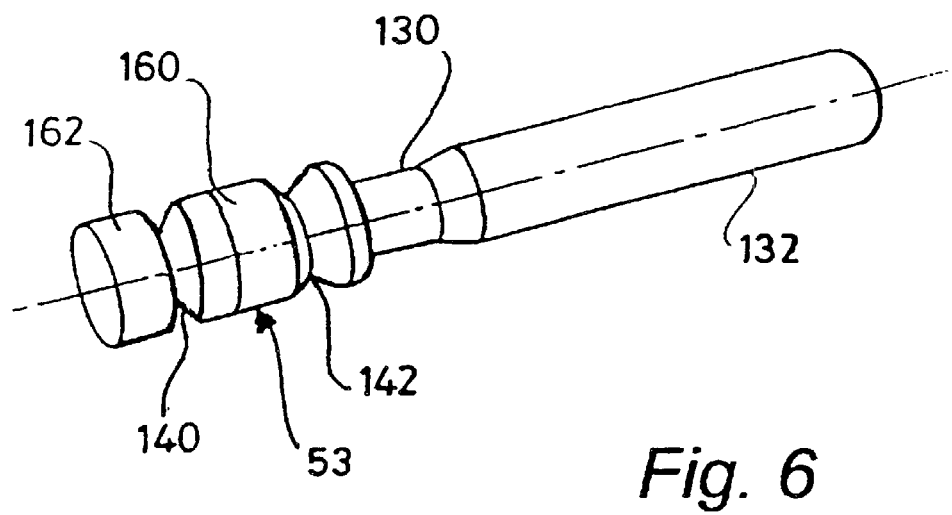
FIG. 6 is a perspective view, not to scale, of the formable pin with a first groove for notch rough grinding and a second groove for notch finish grinding.

The notch grinding pin 53 shown in FIG. 2 is now discussed in more detail in relation to FIGS. 5 and 6.

The formable cylindrical grinding pin 53 shown in FIG. 5 is carried by a smaller diameter cylindrical metal spindle 130 and core 132 for fitting to the spindle (not shown) of a grinding machine. The cylindrical grinding pin 53 is of approximately 4 mm diameter by 10 mm axial extent in which first and second grooves 140, 142 (FIG. 6) are formed in situ by the same forming wheel.

The pin is formed of resin-bonded diamond, resin-bonded grinding grit or vitreous-bonded material.

Reverting to FIG. 5, it can be seen that the cylindrical surface of the pin 53 is divided into two sections, namely a fine grit section 160 nearer the pin spindle 130 and a rough grit section 162 further from the pin spindle 130. The rough grit is two to three times the size of the fine grit. Moreover, from FIG. 6, it can be seen that the first groove 140 is formed in the rough grit section 162. In use, this groove 140 is used for rough grinding a notch. The second groove 142, used for finish grinding the notch, is formed in the stiffer fine grit section 160 of the pin nearer the pin spindle 130.

In use, during a first pass, the rough notch-grinding groove 140 is brought into contact with a pre-machined notch in the edge of a stationary semi-conductor disc (not shown) to rough grind the notch. During a second pass, the notch-finishing groove 142 is brought into contact with the disc to finish grind the notch. The pin may be rotated, for grinding purposes, at speeds of the order of 30,000 rpm or more.

Both grooves 140 and 142 have the same groove profile, and their axial position relative to each other is precisely known. Thus the cutting forces during the finishing pass are constant, which enhances the surface finish and the consistency of the notch profile.

In practice the rough groove 140 removes approximately 90% of the notch material, while the finishing groove 142 removes the remainder. Both the wheel and the disc move during this operation, and the relevant two axes are used to interpolate the notch profile.

Figure 7:
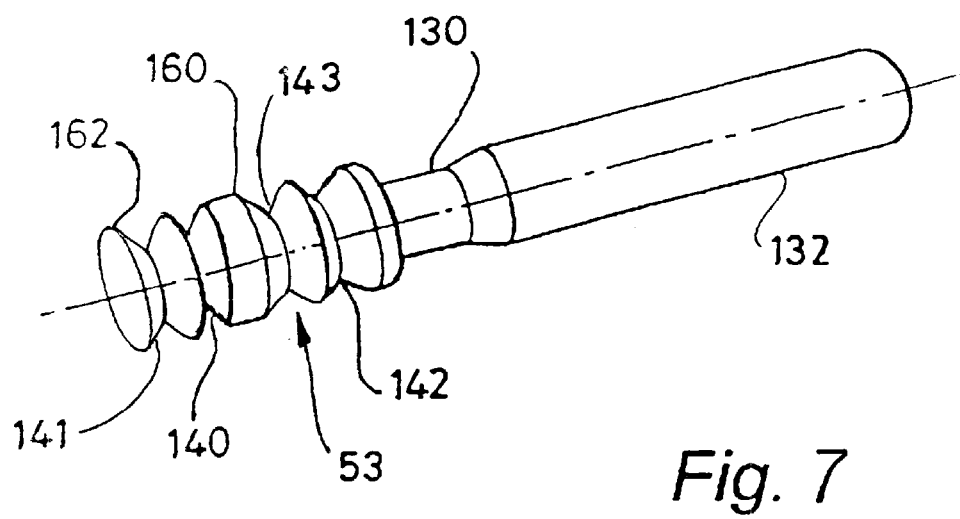
FIG. 7 is a perspective view, not to scale, of a second embodiment of the formable pin, with two grooves for notch rough grinding, and two grooves for notch finish grinding.

Either one or both sections 160, 162 of the pin 53 may be made sufficiently long to enable second or more rough-grinding or finish-grinding grooves to be formed, in the same machine, when the first groove 140 or 142 wears out and is no longer reformable. This extends the life of the pin 52 before it need replacement. FIG. 7 shows a pin having two rough grinding grooves 140 and 141 formed in the rough grit section 162, and two finish grinding grooves 142 and 143 formed in the fine grit section 160.

As the use of a relatively long pin increases the risk of whip, it is important that the finish-grinding notch 142 (or replacement notch or notches) are formed in the stiffer section of the pin nearer the pin spindle 130. Generally, the life of the rough-grinding notch 140 will substantially exceed the life of the finish-grinding notch 142, but provision can be made if desired for the formation of a replacement rough-grinding notch.

Although not shown, the groove-forming wheel may, to advantage for alignment purposes, be mounted on the work spindle carrying the workpiece in which the notch is to be ground.

When the pin is used on a CNC grinding machine, the latter can be programmed automatically to calculate the diameter of the root of the grooves in the notch grinding pin and compensate by interpolation to produce the desired form of notch during the grinding process.

A CNC grinding machine such as that described in WO97/48522 may be used to mount the notch grinding pin and the groove forming wheel.

What is claimed is:

1. A grinding pin for notch-grinding the edge of a silicon wafer comprising a pin spindle and a cylindrical region long enough for at least first and second profiled notch-grinding grooves to be formed thereon respectively in axially spaced sections of the cylindrical region, the first profiled notch grinding groove being axially more remote from the pin spindle than the second profiled notch-grinding groove and being a resin-bonded section of rough grit for rough grinding a notch in a workpiece, and the second profiled notch grinding groove being axially nearer the pin spindle than the first profiled notch-grinding groove and being a resin-bonded section of fine grit for finish grinding the notch.

2. A grinding pin according to claim 1, in which the size of the grit for rough grinding the notch is between two and three times the size of the grit for finish grinding the notch.

3. A grinding pin according to claim 1, in which the grinding material is rough grit resin-bonded CBN or diamond, in the case of the rough grinding section, and fine grit resin-bonded diamond in the case of the finish grinding section.

4. A grinding pin according to claim 2, in which the grinding material is rough grit resin-bonded CBN or diamond, in the case of the rough grinding section, and fine grit resin-bonded diamond in the case of the finish grinding section.

5. A grinding pin according to claim 1, in which either or both of the rough grinding and finish grinding sections of the cylindrical region of the pin, but especially the latter, is long enough for one or more further grooves to be successively formed when the first groove becomes too worn for further use.

6. A grinding pin according to claim 2, in which either or both of the rough grinding and finish grinding sections of the cylindrical region of the pin, but especially the latter, is long enough for one or more further grooves to be successively formed when the first groove becomes too worn for further use.

7. A grinding pin according to claim 3, in which either or both of the rough grinding and finish grinding sections of the cylindrical region of the pin, but especially the latter, is long enough for one or more further grooves to be successively formed when the first groove becomes too worn for further use.

8. A grinding machine, preferably a CNC grinding machine, having a work spindle, a grinding spindle able to carry a blank for forming a grinding pin according to claim 1, the blank having a section of rough grit and a section of fine grit, and a forming wheel rotatable to form a notch-grinding groove in the rough grit section and a notch-finishing groove in the fine grit section.

9. A grinding machine according to claim 8, in which the forming wheel is mounted on the same spindle as the workpiece.

10. A grinding machine, preferably a CNC grinding machine, having a work spindle, a grinding spindle able to carry a blank for forming a grinding pin according to claim 2, the blank having a section of rough grit and a section of fine grit, and a forming wheel rotatable to form a notch-grinding groove in the rough grit section and a notch-finishing groove in the fine grit section.

11. A grinding machine according to claim 10, in which the forming wheel is mounted on the same spindle as the workpiece.

12. A grinding machine, preferably a CNC grinding machine, having a work spindle, a grinding spindle able to carry a blank for forming a grinding pin according to claim 3, the blank having a section of rough grit and a section of fine grit, and a forming wheel rotatable to form a notch-grinding groove in the rough grit section and a notch-finishing groove in the fine grit section.

13. A grinding machine according to claim 12, in which the forming wheel is mounted on the same spindle as the workpiece.

14. A grinding machine, preferably a CNC grinding machine, having a work spindle, a grinding spindle able to carry a blank for forming a grinding pin according to claim 4, the blank having a section of rough grit and a section of fine grit, and a forming wheel rotatable to form a notch-grinding groove in the rough grit section and a notch-finishing groove in the fine grit section.

15. A grinding machine according to claim 14, in which the forming wheel is mounted on the same spindle as the workpiece.

16. A method of forming notch-grinding grooves in a grinding pin on a grinding machine in accordance with claim 8.

17. A method of forming notch-grinding grooves in a grinding pin on a grinding machine in accordance with claim 9.

* * * * *